(12) United States Patent
Ayyagari et al.

(10) Patent No.: US 11,381,447 B2
(45) Date of Patent: Jul. 5, 2022

(54) METHOD, SYSTEM AND APPARATUS FOR DYNAMIC STAGING OF CLIENT COMPUTING DEVICES

(71) Applicant: Zebra Technologies Corporation, Lincolnshire, IL (US)

(72) Inventors: Deepak Ayyagari, Bangalore (IN); Allan Perry Herrod, Mission Viejo, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/189,519

(22) Filed: Nov. 13, 2018

(65) Prior Publication Data

US 2020/0153687 A1    May 14, 2020

(51) Int. Cl.

| | | |
|---|---|---|
| H04L 12/24 | (2006.01) | |
| H04L 29/08 | (2006.01) | |
| G06F 3/16 | (2006.01) | |
| G06K 7/10 | (2006.01) | |
| G06F 8/61 | (2018.01) | |
| H04L 41/0806 | (2022.01) | |
| H04L 41/084 | (2022.01) | |

(Continued)

(52) U.S. Cl.
CPC ............ *H04L 41/0806* (2013.01); *G06F 3/16* (2013.01); *G06F 8/61* (2013.01); *G06K 7/10* (2013.01); *H04L 41/0843* (2013.01); *H04L 67/303* (2013.01); *H04L 41/0886* (2013.01)

(58) Field of Classification Search
CPC ............ H04L 41/0806; H04L 41/0843; H04L 67/303; H04L 41/0886; G06F 3/16; G06F 8/61; G06K 7/10
See application file for complete search history.

(56) References Cited

U.S. PATENT DOCUMENTS 7,062,455 B1* 6/2006 Tobey ................ G06Q 10/08
                                                    235/385
8,746,548 B2* 6/2014 Terwilliger ........ G06Q 20/3276
                                                    235/375
9,292,739 B1* 3/2016 Gray ..................... G06K 9/033

(Continued)

OTHER PUBLICATIONS

Zebra Programming Guide: SGD Printer Commands, published Jan. 31, 2018.

(Continued)

*Primary Examiner* — John A Follansbee
*Assistant Examiner* — Fadi Haj Said

(57) ABSTRACT

A method of dynamic staging in a client device includes: receiving, at the client device, a staging profile identifier definition; generating a staging profile identifier corresponding to one of a plurality of staging data files stored at a server, by: detecting a dynamic field in the staging profile identifier definition; retrieving a set of prompt definitions according to the dynamic field; presenting prompts via an output assembly of the client device according to the prompt definitions; receiving input data corresponding to the prompts via an input assembly of the client device; retrieving a selected parameter corresponding to the input data; and replacing the dynamic field with the selected parameter to generate the staging profile identifier; and retrieving the one of the plurality of staging data files by transmitting a request to the server including the staging profile identifier.

15 Claims, 6 Drawing Sheets

(51) Int. Cl.
*H04L 67/303* (2022.01)
*H04L 41/08* (2022.01)

(56) References Cited

U.S. PATENT DOCUMENTS

| | | | |
|---|---|---|---|
| 9,875,456 B2* | 1/2018 | Favier | G08B 13/2405 |
| 2005/0005760 A1 | 1/2005 | Hull et al. | |
| 2006/0000910 A1 | 1/2006 | Chong et al. | |
| 2007/0027964 A1 | 2/2007 | Herrod et al. | |
| 2010/0234050 A1 | 9/2010 | Herrod | |
| 2010/0258630 A1 | 10/2010 | Shenfield et al. | |
| 2012/0149343 A1 | 6/2012 | Sanka et al. | |
| 2012/0151022 A1 | 6/2012 | Ayyagari et al. | |
| 2013/0024326 A1 | 1/2013 | Dearing et al. | |
| 2013/0037608 A1 | 2/2013 | Evevsky | |
| 2013/0071029 A1* | 3/2013 | Terwilliger | H04L 67/36 382/183 |
| 2013/0173484 A1 | 7/2013 | Wesby | |
| 2014/0104139 A1* | 4/2014 | Buchner | G06F 3/1438 345/1.3 |
| 2014/0298293 A1 | 10/2014 | Nishio et al. | |
| 2015/0041530 A1* | 2/2015 | Burkhart | G06K 19/06037 235/375 |
| 2015/0248498 A1 | 9/2015 | Han | |
| 2015/0339414 A1 | 11/2015 | Kuo et al. | |
| 2016/0029155 A1 | 1/2016 | Kerr et al. | |
| 2016/0044012 A1* | 2/2016 | Carrer | H04W 4/70 726/6 |
| 2016/0065654 A1 | 3/2016 | Cai et al. | |
| 2016/0188886 A1* | 6/2016 | Weiss | G06F 21/6245 726/26 |
| 2016/0283699 A1* | 9/2016 | Levin | H04W 12/08 |
| 2018/0322536 A1 | 11/2018 | Zhang et al. | |
| 2019/0182353 A1 | 6/2019 | Ayyagari et al. | |

OTHER PUBLICATIONS

Motorola Solutions, MSP Client Software Guide (Aug. 2012).
Motorola Inc., Mobility Services Platform 3.2 User's Guide (Jun. 2008).
Zebra, StageNow Android Device Staging (Retrieved on Nov. 30, 2017 from https://www.zebra.com/us/en/products/software/mobile-computers/mobile-app-utilities/stagenow.html).
Zebra, StageNow 2.8 (Retrieved on Nov. 25, 2019 from https://techdocs.zebra.com/stagenow/2-8/about/stageNow 2.8-Zebra Technologies TechDocs).
Zebra, StageNow "Specification Sheet" Copyright (Jun. 2015).
Office Action for U.S. Appl. No. 15/835,669 filed Oct. 6, 2021.
Office Action Response for U.S. Appl. No. 15/835,669 filed Feb. 7, 2022.

* cited by examiner

METHOD, SYSTEM AND APPARATUS FOR DYNAMIC STAGING OF CLIENT COMPUTING DEVICES

BACKGROUND

Various operating environments, such as warehouses and the like, employ sets of client computing devices, such as mobile barcode scanners, label printers and the like. Prior to deployment within the operating environment, such devices typically require configuration, also referred to as staging. For example, staging may include the installation of software particular to the operating environment. The specific configuration information for different devices in the set may not be identical, however.

One staging modality is barcode staging, which takes advantage of the barcode scanning capability. Barcode staging delivers staging information to the device by encoding it in a barcode that is read by the staging client at the device. Since the amount of data that can be effectively stored in a barcode is limited, efficient staging using barcodes typically stores a minimum of configuration information for a given device configuration type in the barcode and acquires additional configuration information over a network that is accessed based on the staging information extracted from the barcode. NFC tag staging is another alternative staging modality that provides similar capabilities and has similar data size limitations.

Another staging modality is audio staging, wherein a device uses its built-in microphone to listen to audio generated by a source (typically a PC) which encodes the staging information as audio sequences that are played through speakers. This modality leverages the fact that many mobile devices are equipped with built-in microphones that are used for telephony and other voice-related applications. To increase the reliability of audio staging in a potentially noisy environment, and to avoid sounds which could be annoying to humans in the vicinity of the device being staged, the encoding of the staging information uses a limited number of audio frequencies that change on a slow cadence. This means that audio staging also has data size limitations since large staging profiles would need to be encoded into long audio sequences, thereby drastically increasing each staging session duration.

Accommodating variations in configuration information across the set of client devices that require different configurations can also lead to lengthy manual configuration processes. This requires an operator to scan a different configuration barcode with each device that needs to be differently configured. Scanning a different barcode or tapping a different NFC tag, for each device model or configuration type for example, is complicated and error-prone. Similarly, with respect to audio staging, playing multiple different audio configuration files at the same time is likely to present many challenges, such as audio signal interference.

In some implementations, attempts to reduce the need for manual scanning of large numbers of barcodes, NFC tags and the like include deploying a host staging device such as a workstation. Rather than scanning barcodes or the like, each client device is configured to discover the host staging device and send a request to the host containing a device identifier. The host staging device executes host software to look up, based on the identifier, which configuration information to provide to the client device. The host device itself, however, introduces additional complexity and processing delay to the staging system as the host device must be provisioned with look-up data and the above-mentioned host software, in addition to the configuration information. Further, in such implementations network connections for the client devices (permitting the client devices to discover the host device) must be configured before staging can begin, and the host device must be present on the same network as the client devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
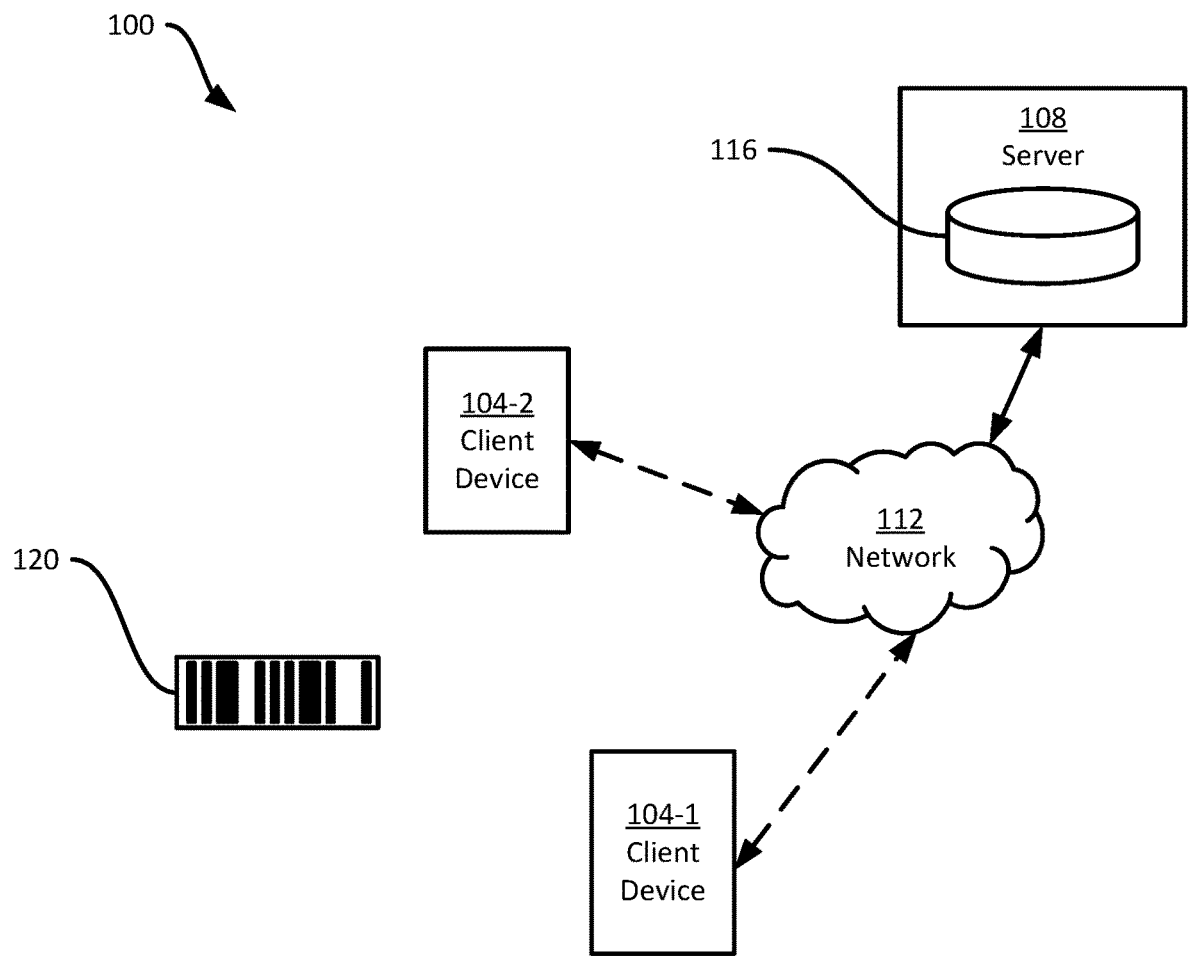
FIG. 1 is a schematic diagram of a system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of dynamic staging in a client device, comprising: receiving, at the client device, a staging profile identifier definition; generating a staging profile identifier corresponding to one of a plurality of staging data files stored at a server, by: detecting a dynamic field in the staging profile identifier definition; retrieving a set of selectable option definitions according to the dynamic field; presenting selectable options via an output assembly of the client device according to the selectable option definitions; receiving a selection of one of the selectable options via an input assembly of the client device; retrieving a selected parameter corresponding to the one of the selectable options from the selectable option definitions; and; and replacing the dynamic field with the local parameter to generate the staging profile identifier; and retrieving the one of the plurality of staging data files by transmitting a request to the server including the staging profile identifier.

Additional examples disclosed herein are directed to a client computing device, comprising: a communications interface; a memory storing a local parameter; and a processor interconnected with the communications interface and the memory, the processor configured to: receive a staging profile identifier definition; generate a staging profile identifier corresponding to one of a plurality of staging data files stored at a server, by: detecting a dynamic field in the staging profile identifier definition; retrieving a set of selectable option definitions according to the dynamic field; presenting selectable options via an output assembly of the client device according to the selectable option definitions; receiving a selection of one of the selectable options via an input assembly of the client device; retrieving a selected parameter corresponding to the one of the selectable options from the selectable option definitions; and replacing the dynamic field with the selected parameter to generate the staging profile identifier; and retrieve the one of the plurality of staging data files by transmitting a request to the server including the staging profile identifier.

Further examples disclosed herein are directed to a method of dynamic staging in a server, comprising: storing, in a memory of the server, (i) a plurality of staging data files, each staging data file containing client device configuration data, and (ii) a plurality of sets of selectable option definitions; receiving, from a client device, a request for one of the sets of selectable option definitions, the request including an identifier of a storage location of the one of the sets of selectable option definitions; retrieving and sending, based on the storage location, the one of the sets of selectable option definitions to the client device; receiving, from the client device, a request for configuration data, the request including a staging profile identifier, wherein the staging profile identifier includes a selected parameter inserted by the client device into a staging profile identifier definition to replace a dynamic field of the staging profile identifier definition and thereby generate the staging profile identifier, responsive to a selection of one of the selectable options at the client device; in response to receiving the request, retrieving one of the staging data files from the memory that corresponds to the staging profile identifier; and transmitting the retrieved staging data file to the client device.

FIG. 1 depicts a system 100 including a plurality of client computing devices, of which two examples 104-1 and 104-2 (collectively referred to as the wireless client computing devices 104, and generically referred to as a wireless client computing device 104) are shown. The client computing devices 104 are also referred to herein simply as client devices 104. The client devices 104 may be barcode scanners, smartphones, tablet computers, label printers, or the like. A plurality of client devices 104 may be deployed in a facility or other operating environment, such as a warehouse, supermarket, or the like, where the client devices 104 perform a variety of functions. Such functions may include any one or more of printing labels, scanning barcodes, capturing images, receiving and displaying instructions (e.g. pick instructions in a warehouse) for an operator, and the like.

The client devices 104, in order to perform the above functions, typically require configuration prior to being deployed in the operating environment. The configuration can include any one or more of loading software applications onto the devices 104, providing network connectivity (e.g. by providing the devices 104 with credentials for connecting to a network that is deployed within the operating environment), and the like. Such pre-deployment configuration of the devices 104 is also referred to as staging the devices 104.

In some deployments of a set of devices 104, a plurality of functions may be performed within the operating environment, with one function being assigned to a first device type (e.g. a label printer) and another function being assigned to a second device type (e.g. a barcode scanner). Different devices types may therefore be staged differently (i.e. be provided with different configuration data). Further, in some implementations devices with differing attributes, such as different hardware models, operating system versions and the like, may be designated to perform the same functions within the operating environment. Although the devices are intended to perform the same functions, their different attributes may require different configuration data to be provided to each device 104. For example, a different version of a barcode scanning application may be provided to each device, depending on the operating system version of that device.

As will be discussed in greater detail below, the system 100 is implemented so as to permit the devices 104 to perform certain actions for retrieving staging data from a server 108 via a network 112. The network 112 may, for example, be a wireless local area network (WLAN) based on a suitable member of the IEEE 802.11 family of communication standards (i.e. a WiFi network). In other examples, however, the network 112 can be a wired network or a combination of wired and wireless networks. Further, the network 112 can include a wide-area network (WAN) such as the Internet.

The server 108 is configured to store a plurality of staging data files in a repository 116. The server 108, as will be seen below, is configured to provide a particular staging data file to a device 104 over the network 112 responsive to receiving a request from the device 104 that includes a staging profile identifier corresponding to the staging data file.

To generate and transmit the above-mentioned request to the server 116, each device 104 is configured to receive the staging profile identifier. As will be discussed below, the devices 104-1 and 104-2 are configured to generate different staging profile identifiers—used to retrieve different staging data files from the server 108—from a single staging profile identifier definition that contains one or more dynamic fields. The staging profile identifier definition may be received at each device 104 in a variety of manners. In the example shown in FIG. 1, the staging profile identifier definition is encoded in an indicium 120, such as a barcode (as depicted) or an NFC tag, or in an audio staging file, that each device 104 is configured to capture and process.

More generally, the system 100 permits the provision of a number of different staging data files to a plurality of devices 104 via deployment of a smaller number of staging profile identifier definitions (including, in some embodiments, a single staging profile identifier definition).

Figure 2A:
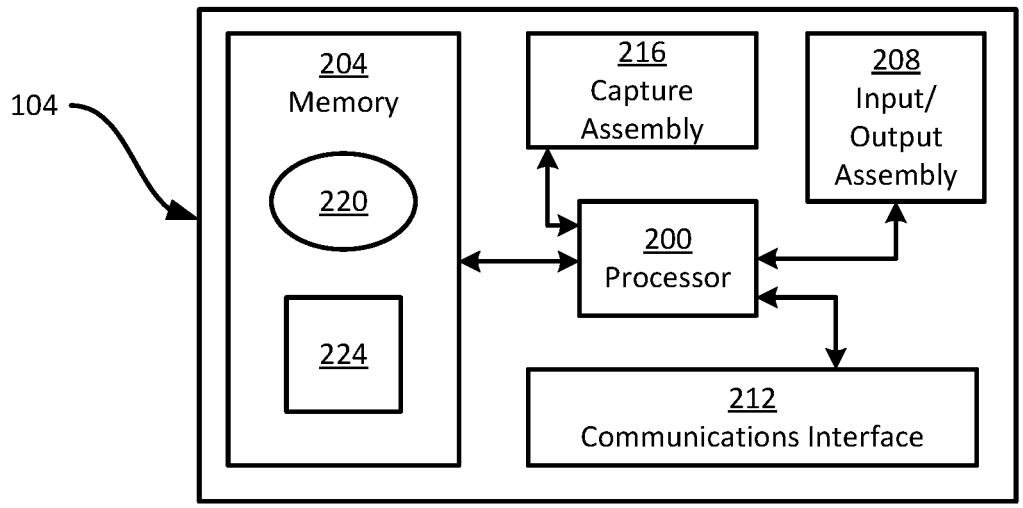
FIG. 2A is a block diagram of certain internal hardware components of a client device of FIG. 1.

Before discussing the functionality of the system 100 in greater detail, certain components of the devices 104 will be described. Turning to FIG. 2A, certain internal components of a client device 104 are illustrated. Each of the client devices 104-1 and 104-2 in the system 100 include the components shown in FIG. 2A, although the client devices 104 may have heterogeneous form factors and implementations of the components shown. Each device 104 may also include additional components not shown in FIG. 2A. For example, the device 104-1 can include a label printer assembly (not shown), while the device 104-2 does not include a label printer assembly in some embodiments.

The device 104, as illustrated in FIG. 2A, includes a central processing unit (CPU), also referred to as a processor 200, interconnected with a non-transitory computer readable storage medium, such as a memory 204. The memory 204 includes any suitable combination of volatile (e.g. Random Access Memory (RAM)) and non-volatile (e.g. read only memory (ROM), Electrically Erasable Programmable Read Only Memory (EEPROM), flash) memory. The processor 200 and the memory 204 each comprise one or more integrated circuits (ICs).

The device 104 also includes at least one input device, and at least one output device, illustrated in FIG. 2A as an input/output assembly 208 interconnected with the processor 200. In the present example, the input/output assembly is a touch-enabled display (i.e. a display panel with an integrated touch screen). In other examples, the input and output devices need not be integrated as shown in FIG. 2A. The input device includes any suitable one, or any suitable combination of, a touch screen, a keypad, a trigger (e.g. to initiate the performance of an encoding or scanning task), a microphone and the like. The output device includes any suitable one, or any suitable combination of a display (e.g., integrated with the above-mentioned touch screen), a speaker, and the like. The input/output device 208 is configured to receive input and provide data representative of the received input to the processor 200, and to receive output from the processor 200 and present the output, e.g. via the emission of sound from the speaker, the rendering of visual indications on the display, and the like.

The device 104 also includes a communications interface 212, enabling the device 104 to exchange data with other computing devices, such as the server 108 vi the network 112. The communications interface 212 therefore includes any suitable hardware (e.g. transmitters, receivers, network interface controllers and the like) allowing the device 104 to communicate, e.g. over the network 112.

The device 104 also includes a capture assembly 216 configured to capture the indicium 120 shown in FIG. 1 and provide the indicium 120, or data decoded from the indicium 120, to the processor 200. The capture assembly 216, in the present example in which the indicium 120 is a barcode, is a barcode scanning assembly and therefore includes one or more of a laser-based barcode scanner, a digital image sensor and the like. In other examples, the indicium 120 may be replaced with a radio frequency-based tag such as a near field communication (NFC) tag or a radio-frequency identification (RFID) tag. In such examples, the indicium 120 may be replaced by an audio signal emitted by a speaker (not shown) and encoding the staging profile identifier definition. In such embodiments, the capture assembly 216 includes a microphone.

The components of the device 104 are interconnected by communication buses, and powered by a battery or other power source, over the above-mentioned communication buses or by distinct power buses.

The memory 204 of the device 104 stores a plurality of applications, each including a plurality of computer readable instructions executable by the processor 200. The execution of the above-mentioned instructions by the processor 200 causes the device 104 to implement certain functionality, as discussed herein. The applications are therefore said to be configured to perform that functionality in the discussion below. In the present example, the memory 204 of the device 104 stores a staging application 220, also referred to herein as the application 220. The device 104 is configured, via execution of the application 220 by the processor 200, to receive the staging profile identifier definition, to generate a staging profile identifier therefrom, and to request a particular one of the plurality of staging data files in the repository 116. The device 104 is further configured, upon receipt of the requested staging data file, to execute one or more instructions contained in the staging data file to complete the staging of the device 104.

The memory 204 also stores a repository 224 containing one or more parameters. The parameters in the repository can include local parameters defining various attributes of the device 104. The local parameters can include, for example, an operating system version of the device 104, a model number of the device 104, and the like. Local parameters may therefore also be referred to as intrinsic parameters, in that they are parameters discoverable by the device 104 without interacting with any external entity. The repository 224 may also contain one or more selectable parameters, which may also be referred to as extrinsic parameters because the device 104 is required to interact with an external entity to discover the selectable parameters. Interaction with an external entity includes, for example, receiving input from an operator via the input/output assembly 208 corresponding to a prompt presented by the device 104. Example prompts include a set of selectable options, a field for receiving text or other data, and binary prompts (e.g. check boxes, radio buttons, etc.). Examples of selectable, or extrinsic, parameters include an operator identifier (e.g. a login ID), a department or division identifier, a location (e.g. an internal name for a building), or a function (e.g. inventory, sales, or the like). As will be discussed below, the parameters in the repository 224, including either or both of the above-mentioned local (i.e. intrinsic) and selectable (i.e. extrinsic) parameters, are employed via the execution of the application 220 to generate the staging profile identifier.

In other examples, the processor 200, as configured by the execution of the application 220, is implemented as one or more specifically-configured hardware elements, such as field-programmable gate arrays (FPGAs) and/or application-specific integrated circuits (ASICs).

Figure 2B:
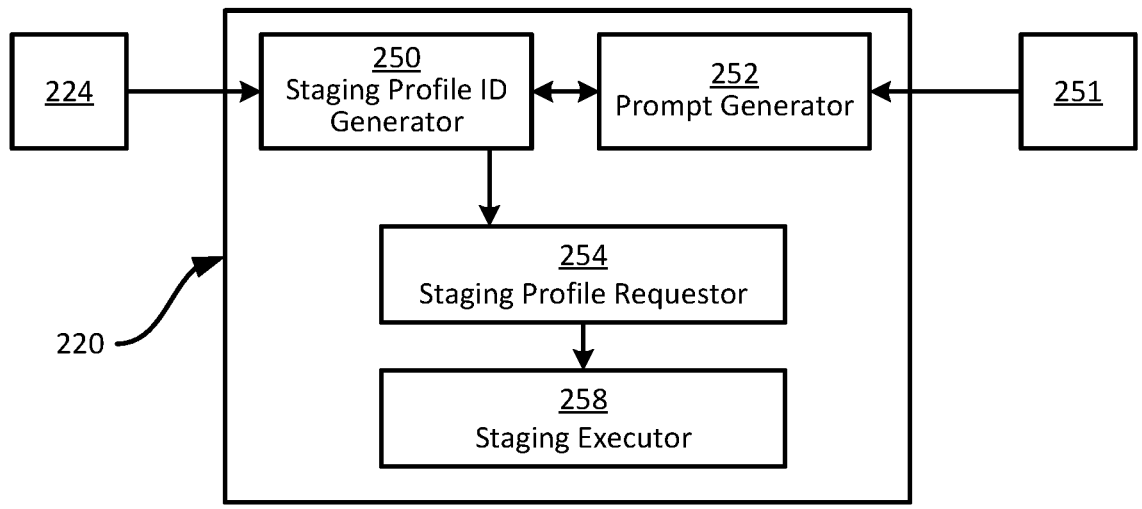
FIG. 2B is a block diagram of certain internal components of the client device of FIG. 2A.

Turning to FIG. 2B, certain components of the application 220 are illustrated. In other embodiments, the components of the application 220 may be implemented as a plurality of distinct applications executed by the processor 200. In further examples, one or more of the components of the application 220 shown in FIG. 2B can be implemented as specifically configured hardware elements, rather than as computer-readable instructions for execution by the processor 200. For example, one or more of the components shown in FIG. 2B can be implemented as an FPGA, and ASIC, or the like.

The application 220 includes a staging profile identifier generator 250, configured to generate a staging profile identifier based on the staging profile identifier definition received via capture of the indicium 120, and on one or both of the local parameters and selected parameters mentioned above. As noted earlier, the selected parameters are obtained via receipt of input from the input/output assembly 208, such as selection (e.g. by manipulation of the input/output assembly 208 by an operator of the mobile device 104) of one of a set of selectable options or entry of data into a field. More generally, the selected parameters are obtained via receipt of input data from the input/output assembly 208 corresponding to a set of prompts. The set of prompts, and the corresponding parameters to be employed in generating the staging profile identifier, are defined in prompt definitions 251 retrieved by a prompt generator 252 of the application 220. The prompt generator 252 is configured to control the display of the input/output assembly 208 to present prompts, such as selectable options, defined by the definitions 251, and based on which selectable option is selected, what data is entered into a prompt field or the like, to provide a corresponding selected parameter to the staging profile identifier 250. The definitions 251, as will be discussed in greater detail below, may be retrieved from the server 108.

The application 220 also includes a staging profile requestor 254, configured to generate and transmit a request to the server 108 containing the staging profile identifier generated by the generator 250. Further, the application 220 includes a staging executor 258, configured to execute the instructions contained in the staging data file received from the server 108 in response to the request sent by the requestor 254.

Figure 3:
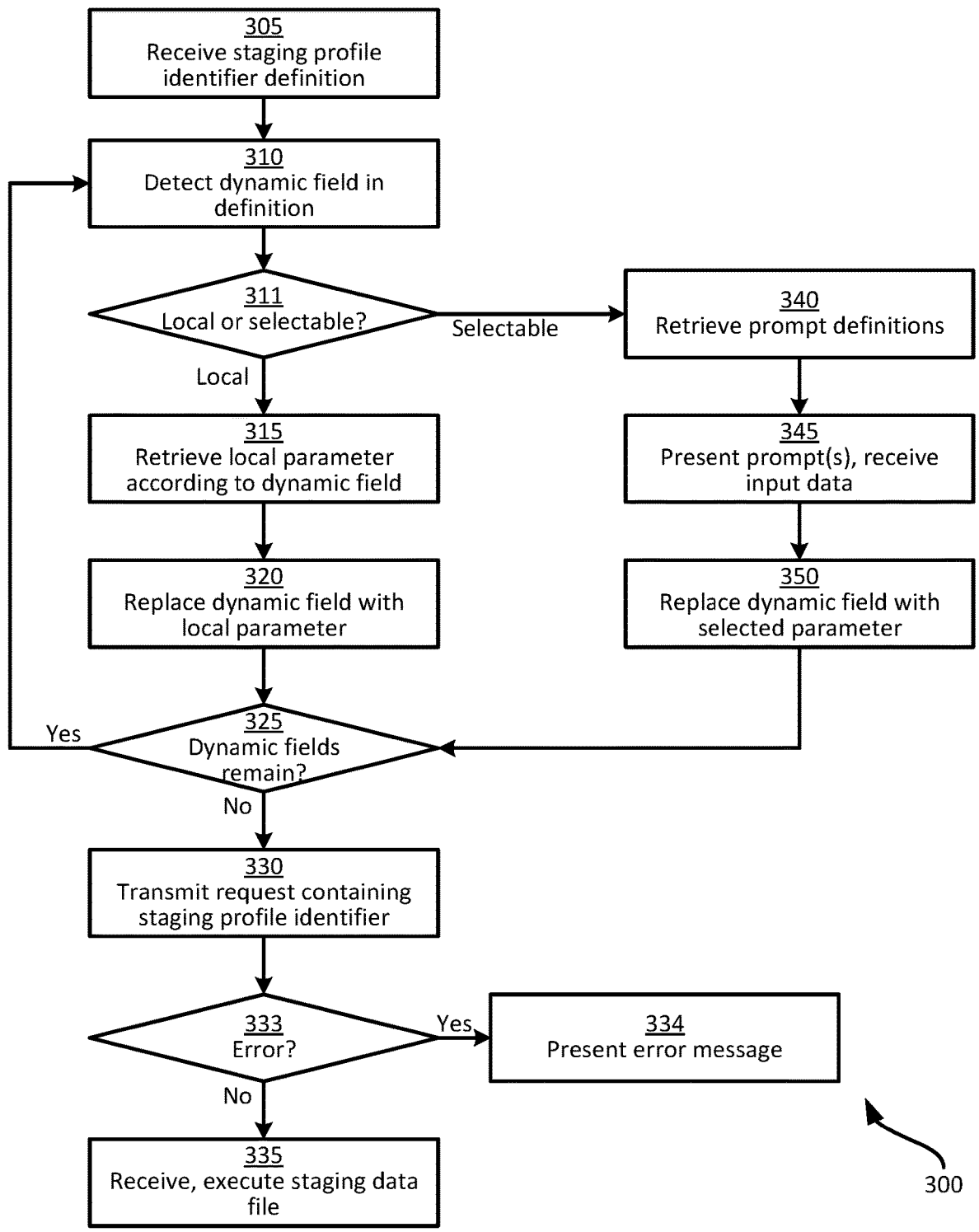
FIG. 3 is a flowchart of a method of dynamically staging the client devices of the system of FIG. 1.

Turning now to FIG. 3, a method 300 of dynamically staging client computing devices is illustrated. The method 300 will be described in conjunction with its performance on the system 100. More specifically, the method 300 as described below is performed by the devices 104 in the system 100, with reference to the components of each device 104 as illustrated in FIGS. 2A and 2B. As will be apparent in the discussion below, each device 104 may perform a separate instance of the method 300. In the example performance of the method 300 described below, the method 300 is performed by the device 104-1. An additional performance of the method 300 by the device 104-2 will then be described. The components shown in FIGS. 2A and 2B, in the discussion below, are referred to with the suffix "-1" for the device 104-1, and with the suffix "-2" for the device 104-2.

At block 305, the device 104-1, and particularly the staging profile identifier generator 250-1 of the device 104-1 is configured to receive a staging profile identifier definition. In the present example, the generator 250-1 is configured to control the capture assembly 216-1 of the device 104-1 to capture the indicium 120 and decode the indicium 120 to extract therefrom the definition. For example, the generator 250-1 can be configured to initiate the capture operation responsive to actuation of an input device (e.g. a scan trigger) of the input/output assembly 208-1 of the device 104-1.

Figure 4:
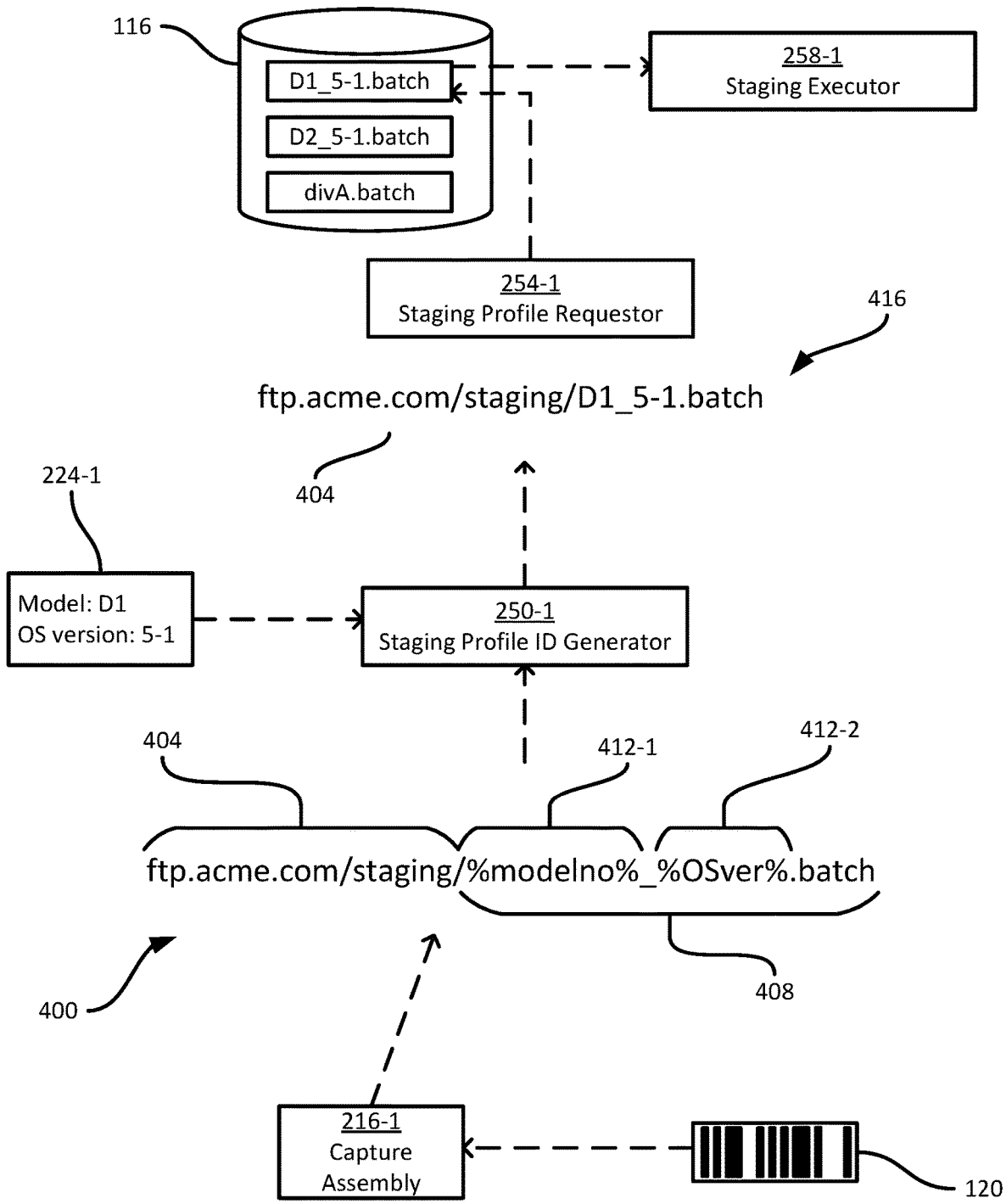
FIG. 4 illustrates a performance of the method of FIG. 3 by a first device in the system of FIG. 1.

Turning to FIG. 4, the performance of block 305 is illustrated, in which the indicium 120 is captured by the capture assembly 216-1 and a staging profile identifier definition 400 is decoded therefrom. In the present example, the definition 400 is a string. More specifically, the definition 400 is a string including a server identifier portion 404 and a filename portion 408. In the present example, the server identifier portion is static (i.e. does not include any dynamic fields), and identifies a network location of the server 108. The filename portion includes two dynamic fields 412-1 and 412-2 that, when replaced with local parameters as discussed below, permit the generation of one of a plurality of specific filenames corresponding to one of a plurality of specific staging data files at the server 108 (i.e. in the repository 116). In other examples, the server identifier portion 404 may also include dynamic fields. That is, a plurality of servers can be included in the system 100, and the server to which the device 104-1 sends a request for staging data is determined dynamically, based on either or both of local and selectable parameters (e.g. based on an extrinsic parameter identifying a building or other facility within an enterprise, in which the client device 104 is to be deployed).

Returning to FIG. 3, the generator 250-1 is configured to generate a staging profile identifier from the staging profile identifier definition 400 beginning at block 310. As will be seen below, from the single staging profile identifier definition 400 received at block 305, the devices 104 can generate any of a plurality of staging profile identifiers (corresponding to specific staging data files at the server 108).

At block 310, the generator 250-1 is configured to detect a dynamic field in the staging profile identifier definition 400. The generator 250-1 is therefore, in the present example, configured to detect the dynamic field 412-1 shown in FIG. 4. The generator 250-1 may include a list of dynamic fields that can be included in the definition 400, and can traverse the definition 400 to search for portions of the definition 400 that match any dynamic fields in the list. For example, dynamic fields may be bounded by predefined characters such as the percentage ("%") characters shown in FIG. 4. Distinct types of dynamic fields, such as those referring to local parameters and those referring to selectable parameters, may be bounded by distinct predefined characters. In the examples discussed below, the percentage characters delimits dynamic fields referring to local parameters, while brace characters ("{" and "}") delimit dynamic fields referring to selectable parameters. A wide variety of other characters or delimiting mechanisms may also be employed to denote dynamic fields.

At block 311, the generator 250 is configured to determine whether the dynamic field detected at block 310 corresponds to a local parameter or to a selectable parameter. The determination at block 311 may be performed, for example, according to which bounding characters delimit the dynamic field. When the determination at block 311 is that the dynamic field corresponds to a selectable parameter, the performance of the method 300 proceeds to blocks 340-350. In the example shown in FIG. 4, however, the dynamic fields 412 are bounded by percentage characters, and the dynamic fields 412 therefore correspond to local parameters. Performance of the method 300 therefore proceeds to block 315. The performance of blocks 340-350 will be discussed following the below discussion of blocks 315-325.

Having detected a dynamic field corresponding to a local parameter at blocks 310 and 311, at block 315 the generator 250-1 is configured to retrieve a local parameter according to the dynamic field. Referring again to FIG. 4, the dynamic field 412-1 corresponds to a device model number in this example, and at block 315 the generator 250-1 is therefore configured to retrieve a model number from the local parameters 224-1. At block 320, the generator 250-1 is configured to replace the dynamic field 412-1 (i.e. the field detected at block 310) with the local parameter retrieved at block 315. At block 325, the generator 250-1 is configured to determine whether any further dynamic fields remain to be processed. In the present example, the determination at block 325 is affirmative, as the field 412-2 has not yet been processed.

As will now be apparent to those skilled in the art, the generator 250-1 can be configured, at block 310, to detect all dynamic fields and select one field for processing via blocks 311 and (when the dynamic field corresponds to a local parameter) 315 and 320 or 340-350 (when the dynamic field corresponds to a selectable parameter). The generator 250-1 can then be configured to determine whether any dynamic fields previously detected at block 310 remain to be processed via blocks 315 and 320 (or blocks 340-350, when the dynamic field corresponds to a selectable parameter). In another embodiment, the generator 250-1 is configured to detect a single dynamic field at block 310, and at block 325, after the replacement of that dynamic field, to determine whether any dynamic fields remain in the modified string (i.e. after the first dynamic field has been replaced).

Returning to block 310, the generator 250-1 is configured to select the dynamic field 412-2 for further processing. The dynamic field 412-2 corresponds to an operating system version local parameter, and thus from block 311 the generator 250-1 is again configured to proceed to block 315. The generator 250-1 is therefore configured, at block 315, to retrieve an operating system version from the local parameters 224-1, and to replace the dynamic field 412-2 with the retrieved operating system version at block 320.

Referring again to FIG. 4, the result of the two performances of blocks 310, 311, 315 and 320 are illustrated in the form of a staging profile identifier 416 generated by the generator 250-1. In particular, the server identifier portion 404 of the definition 400 remains unchanged (as it does not contain any dynamic fields in this example). However, the dynamic fields 412-1 and 412-2 have been replaced with the model number "D1" and the operating system version "5-1", respectively. The generator 250-1, in other words, generates the identifier 416 by modifying the definition 400 according to the dynamic fields 412 and the local parameters 224-1.

In the example shown in FIG. 4, as noted above, the dynamic fields 412 are bounded by predefined characters, such as the percentage character "%". The generator 250 can therefore be configured to detect the dynamic fields 412 by traversing the definition 400 to detect such characters. As noted earlier, the generator 250 can be configured in some embodiments to repeatedly traverse the definition 400 to detect further dynamic fields. In such embodiments, a previously inserted local parameter may contain the predefined character (e.g. the percentage character) and therefore result in a further detection of a dynamic field. In other words, the local parameters themselves may refer to multiple additional local parameters. The generator 250 can also be configured to guard against unbounded recursion at block 325 when a local parameter contains the predefined character but does not represent a further dynamic field. In other words, the generator 250 can be configured to ignore certain of the predefined characters to prevent undesired recursion, for example by detecting not only the presence of the predefined character, but also the presence of other indications of whether or not a portion of the definition 400 is a dynamic filed (such as the presence of another predefined character within a predefined distance).

Returning to FIG. 3, at a further performance of block 325, the generator 250-1 determines that no dynamic fields remain to be processed in the definition 400. The performance of the method 300 therefore proceeds to block 330. At block 330, the requestor 254-1 is configured to generate and transmit a request to the server 108, via the communications interface. The request contains the staging profile identifier 416 generated via the performance(s) of blocks 310 to 325. In the present example, as shown in FIG. 4, the staging profile identifier 416 is a uniform resource identifier (URI) in the form of a file transfer protocol (FTP) address. Other forms are also contemplated for the request sent at block 330. For example, the requestor 254-1 can be configured to transmit the request as a message addressed to a predefined network location (e.g. stored in the application 220) and containing the staging profile identifier (e.g. a filename, without the server identifier portion shown in FIG. 4) as the body of the message.

At block 333, the requestor 254 is configured to determine whether the request sent at block 330 resulted in an error, such as a response from the server 108 indicating that the requested staging profile does not exist. When the determination at block 333 is affirmative, the client device 104 is configured to present an error message, e.g. on a display of the input/output assembly 208, informing the operator that the retrieval of a staging profile failed. Such a failure may result, as will be evident in the example discussed below in connection with FIG. 6, from incorrect data entered into a prompt by the operator of the client device 104.

At block 335, as also shown in FIG. 4, the executor 258-1 is configured to receive one of the plurality of staging data files in the repository 116 from the server 108. More specifically, as seen in FIG. 4, the staging profile identifier 416 includes a string "D1_5-1.batch" that matches the filename of a specific one of the staging data files stored in the repository 116. The server 108, therefore, needs only retrieve the matching staging data file and send the staging data file to the device 104-1. Accordingly, the server 108 may be implemented as a file server (e.g. an FTP server) without specialized staging host functionality.

Execution of the staging data file at block 335 includes any of a variety of actions. The staging data file, as will be understood by those skilled in the art, includes instructions executable by the device 104-1 to perform any one or more of downloading and installing additional applications, updating configuration settings (e.g. changing privacy settings, storing network connection settings, and the like).

Figure 5:
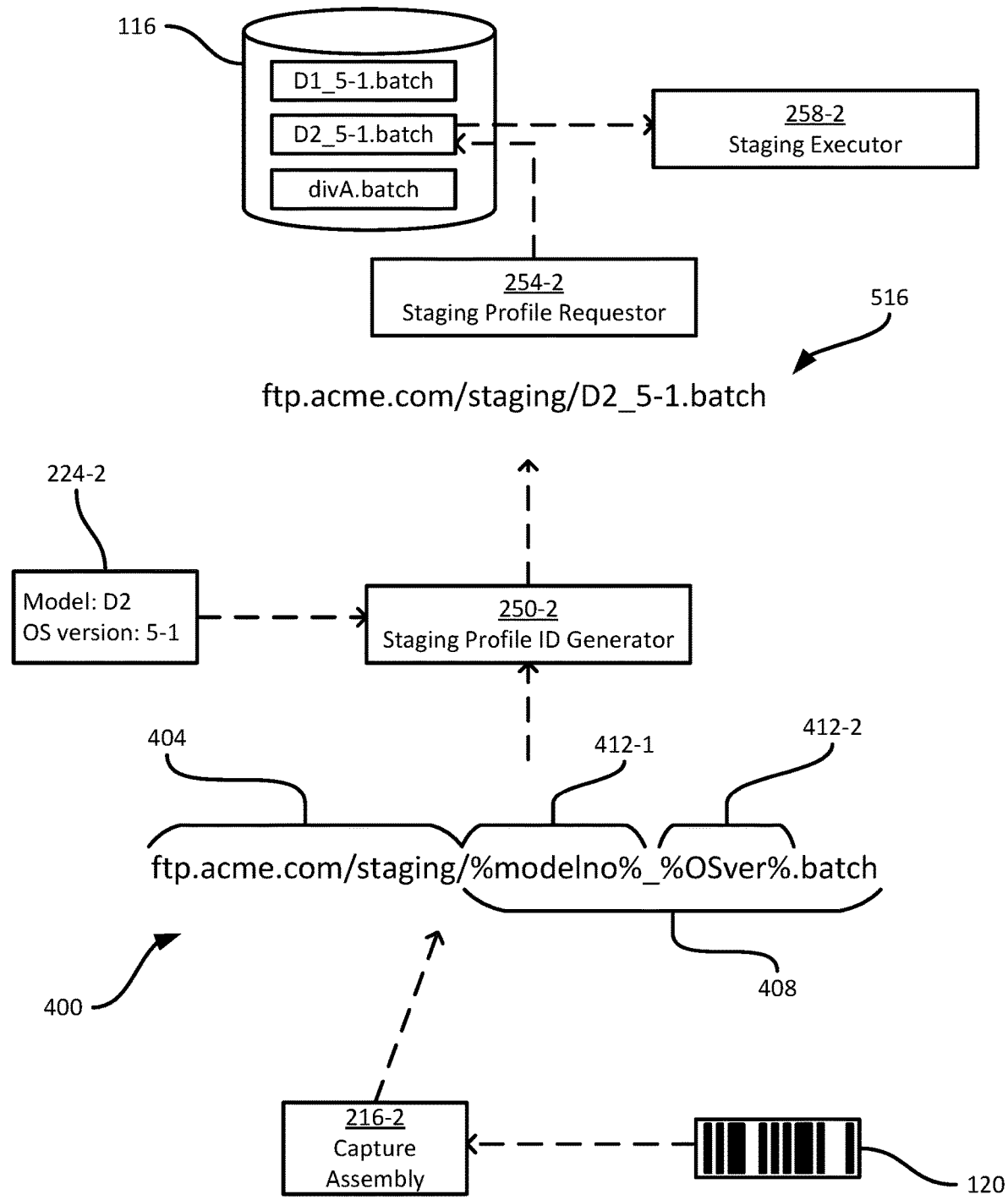
FIG. 5 illustrates a performance of the method of FIG. 3 by a second device in the system of FIG. 1.

Turning now to FIG. 5, a further performance of the method 300 is illustrated by the device 104-2. As seen in FIG. 5, at block 305 the device 104-2 captures the same indicium 120 as shown in FIG. 4, and therefore extracts therefrom the same definition 400 including the dynamic fields 412-1 and 412-2. However, via blocks 310-325, the generator 250-2 generates a staging profile identifier 516 distinct from the identifier 416 shown in FIG. 4, because the local parameters 224-2 of the device 104-2 include a different model number than local parameters 224-1 of the device 104-1. The staging profile identifier 516, therefore, includes the filename "D2_5-1.batch" rather than the filename "D1_5-1.batch" included in the staging profile identifier 416. Following the performance of block 330 by the requestor 254-2, therefore, the executor 258-2 receives a different staging data file than the executor 258-1.

Figure 6:
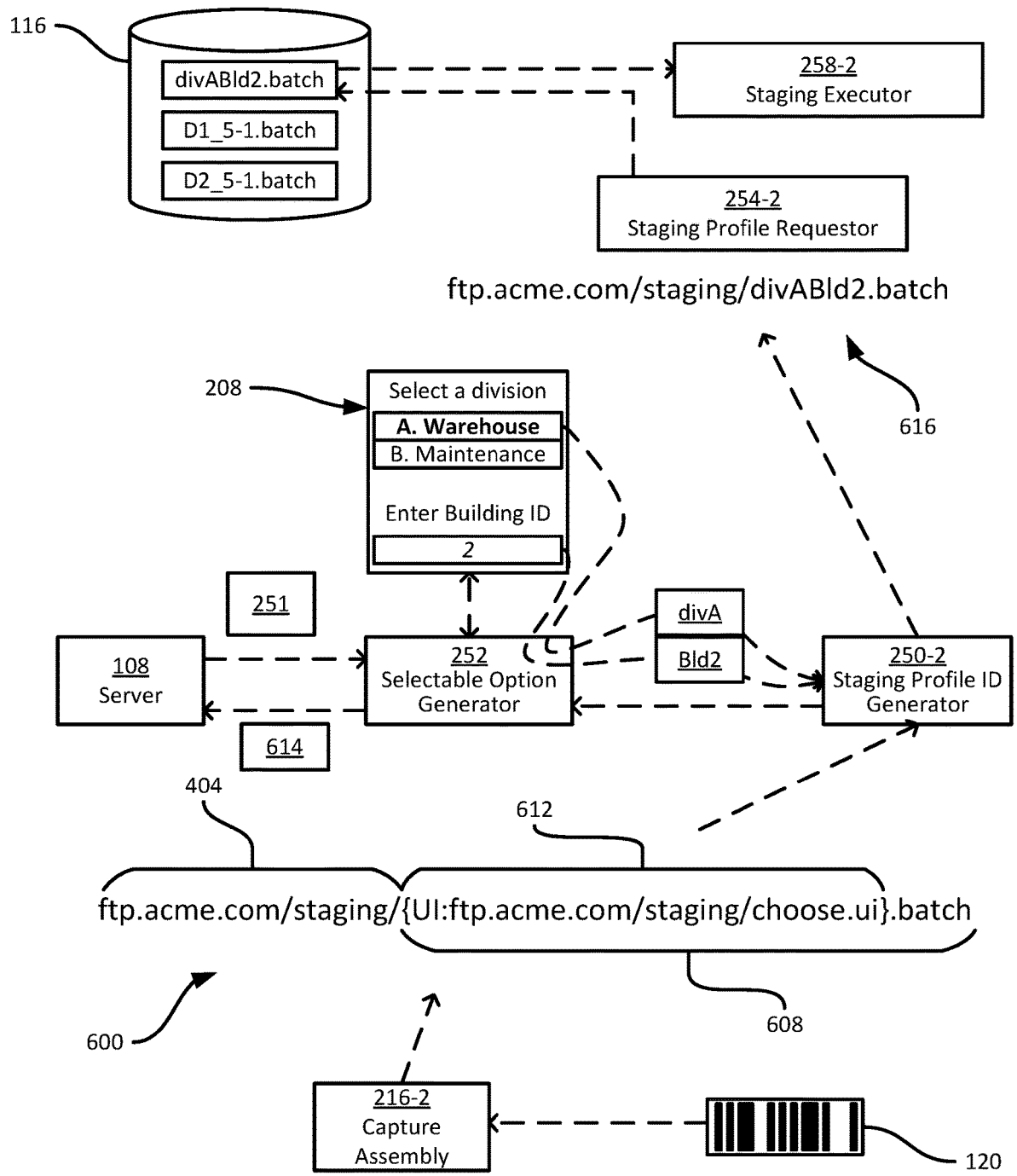
FIG. 6 illustrates a further performance of the method of FIG. 3 by the second device in the system of FIG. 1.

Returning to FIG. 3, the performance of blocks 340-350 will be discussed, following a determination at block 311 that the dynamic field detected at block 310 corresponds to a selected (i.e. extrinsic) parameter rather than a local (i.e. intrinsic) parameter. Following such a determination, at block 340 the staging profile identifier generator 250 is configured to retrieve a set of prompt definitions according to the dynamic field. Turning to FIG. 6, the capture assembly 216-2 is shown capturing the indicium 120 and decoding therefrom a staging profile identifier definition 600 that includes the above-mentioned server identifier portion 404.

The definition 600 also includes a filename portion 608 that contains a dynamic field 612. The dynamic field 612 is bounded by brace characters rather than percentage characters, and the determination at block 311 is therefore that the dynamic field 612 corresponds to a selectable parameter. As noted earlier, various other mechanisms for distinguishing between dynamic fields referring to local parameters and dynamic fields referring to selectable parameters are contemplated. For example, as seen in FIG. 6, the dynamic field 612 begins with the string "UI:", which may constitute a command to generate a graphical user interface. The string "UI" itself may therefore indicate at block 311 that the dynamic field 612 corresponds to a selectable parameter.

In the present example, the set of prompt definitions 251 retrieved at block 340 are retrieved from the server 108 itself, although it will be understood that the prompt definitions 251 can also be retrieved from other network locations. In particular, the dynamic field 612 contains an identifier of a storage location for the selectable option definitions. In the illustrated example, the storage location identifier is a URI identifying the file "choose.ui" at the server 108.

Responsive to detecting the dynamic field 612 as a field corresponding to a selectable parameter, the generator 250-2 is therefore configured to invoke the prompt generator 252-2, e.g. by passing the storage location identifier within the dynamic field 612 to the prompt generator 252-2. The prompt generator 252-2, in turn, is configured to transmit a request 614 to the server 108 containing the storage location identifier, and to receive the prompt definitions 251 from the server 108 in response to the request.

The prompt definitions 251 define a plurality of prompts for presentation via an output device of the mobile device 104, as well as a selectable parameter corresponding to each prompt, for insertion into the staging profile identifier definition 600 in place of the dynamic field 612. Table 1, below, illustrates an example set of selectable option definitions.

TABLE 1

Example Selectable Option Definitions

| Prompt ID | Prompt Type | Option Text | Selectable Parameter |
|---|---|---|---|
| Prompt 1 | Option | A. Warehouse | divA |
| Prompt 2 | Option | B. Maintenance | divB |
| Prompt 3 | Data Entry | N/A | Bld[input data] |

As shown above, the example prompt definitions 251 define two selectable options for presentation via the input/output assembly 208, including an option named "A. Warehouse" and an option named "B. Maintenance". The prompt definitions also define a field ("Prompt3") for data entry. The prompts shown above prompt an operator of the mobile device 104 to select one of the two selectable options corresponding to a division or department of an enterprise in which the mobile device 104 is to be deployed. The prompts also prompt the operator to enter a building identifier (such building identifiers may be predefined within the enterprise and therefore known to the operator). A wide variety of other options and other prompts will also occur to those skilled in the art, generally corresponding to information not intrinsically available to a mobile device 104 locally (i.e. available within the memory 204 without receipt of input data from the operator). Other examples of selectable options specified by the definitions 251 can include staging actions. For example, a further set of selectable options can include an option to perform a factory reset or wipe of the mobile device 104, an option to unlock the mobile device 104 for administrative access, an option to lock the mobile device 104 for production use, and the like, each of which corresponds to a different staging profile file in the repository 116.

As shown in FIG. 6, the definitions 251 can also define header text or other descriptive data for presentation along with the options (e.g. the string "Please select a division" for the two selectable option prompts, and the string "Enter Building ID" for the data entry prompt). The definitions 251 also contain, in association with each option, a selectable parameter for insertion into the staging profile identifier definition 600. In particular, in the present example the selectable parameters are "divA" (corresponding to the option "A. Warehouse") and "divB" (corresponding to the option "B. Maintenance"). When the prompt is a data entry prompt, as in the case of the third row of Table 1, the selectable parameter may simply be the data received in the prompt. In the present example, the corresponding selectable parameter is the data received in the data entry field, prepended with the string "Bld".

Returning to FIG. 3, at block 345 the prompt generator 252-2 is configured to control the input/output assembly 208, at block 345, to present the prompts (in the present example, the two selectable options and the prompt shown in Table 1) defined by the definitions 251, and to receive input data corresponding to the prompts. Presenting the prompts can be performed by rendering the prompts on a display, generating audio output via a text-to-speech engine, or the like. Receiving input data can also vary depending on the nature of the input/output assembly 208. For example, input data can include receiving a selection via a touch screen, receiving audio commands via a microphone (e.g. for conversion to text), and the like. As shown in FIG. 6, in the present example a selection of the option "A. Warehouse" is received via the touch screen of the input/output assembly 208. In addition, the character "2" is received as input data in connection with the data entry prompt. The prompt generator 252-2 is therefore configured, based on the selection of the option "A. Warehouse", to retrieve the corresponding selectable parameter "divA" and return the selectable parameter to the staging profile identifier generator 250-2. The generator 252-2 is also configured, based on the data entered in the data entry field, to return the selectable parameter "Bld2" to the staging profile identifier generator 250-2. As shown in FIG. 6, in this example two selected parameters arising from the prompts defined by the definitions 251 are returned to the generator 250 for concatenation. In other examples, each selectable parameter may correspond to a distinct dynamic field. In such embodiments, a first dynamic field may correspond to the two selectable options shown in FIG. 6, while a second dynamic field may correspond to the data entry field.

The staging profile identifier generator 250-2 is configured, at block 350, to replace the dynamic field 612 with the selected parameters received from the prompt generator 252-2. As shown in FIG. 6, the replacement effected at block 350 yields a staging profile identifier 616 in which the filename portion 608 has been updated to contain the filename "divABld2.batch". Following replacement of the dynamic field 612 at block 350, the performance of the method 300 returns to block 325, as discussed above. When the determination at block 325 is negative (as it is in the case of FIG. 6, in which the definition 600 contains only one dynamic field 612), the staging profile requestor 254-2 is configured to transmit a request at block 330 to the server 108 containing the staging profile identifier 616. The server 108, in response to the request, returns the file "divABld2.batch" for execution by the staging executor 258-2 at block 335.

It is contemplated that staging profile identifier definitions (e.g. the definitions 400 and 600) can include dynamic fields corresponding to both local and selectable parameters in some embodiments. In further embodiments, a selectable parameter can itself contain a dynamic field corresponding to a local parameter. Thus selection of the selectable parameter can result in the insertion of a further dynamic field in the definition 600 (e.g. corresponding to an operating system version, as shown in connection with FIGS. 4 and 5).

Variations to the above systems and methods are contemplated. For example, the dynamic fields mentioned above corresponding to model number and operating system version can be substituted or supplemented with other suitable dynamic fields. Other dynamic fields that may be included in the staging profile identifier definition include software versions for other applications than the operating system. Further dynamic fields can corresponding to local parameters such as a location indicator (e.g. GPS coordinates, a network identifier such as an SSID that corresponds to a particular location).

In some examples, the staging profile identifier definition can include a dynamic field that refers not to a local parameter of the device 104 processing the definition, but rather to another portion of the definition itself. For example, the server identifier portion of the staging profile identifier definition may be encrypted. In such embodiments, the generator 250 is configured to decrypt the server identifier portion. The definition may repeat the server identifier portion (i.e. may include several copies of the server identifier portion), but the encrypted version of the server identifier may be too long to store multiple times in the encoding capacity provided by the indicium 120. The definition can therefore include the encrypted server identifier portion once, and for any other instances of the server identifier, a dynamic field referring to the server identifier.

The indicium, or the radio-frequency or audio signals mentioned earlier, may also include data beyond the staging profile identifier definition. For example, the indicium 120 can include, in addition to the definition 400, network configuration data identifying the network 112 (e.g. by SSID) and any credentials required to enable the devices 104 to connect to the network 112. The network configuration data itself can be dynamic, as described above in connection with the staging profile identifier definition. Thus, for example, the network configuration data can contain one or more dynamic fields permitting different device models (or devices with different software versions and the like) to connect to different networks. For example, distinct wireless networks may be deployed with identifiers (e.g. SSIDs) containing device model numbers.

In still further embodiments, the prompt definitions 251 can define nested sets of prompts, such that a given selectable option corresponds to two or more other prompts, such as selectable sub-options and/or data entry fields, each of which corresponds to a distinct selectable parameter for insertion in the definition 600. In other examples, when the indicium 120 has sufficient storage capacity to encode the prompt definitions 251 therein, the dynamic field 612 can contain the prompt definitions 251 themselves, and the request to the server 108 to retrieve the definitions 251 can be omitted.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of dynamic staging in a client device, comprising:
  receiving, at the client device, a staging profile identifier definition including a string of characters;
  generating a staging profile identifier corresponding to one of a plurality of staging data files stored at a server, by:
    detecting a bounding character in the string of characters, the bounding character indicating a dynamic field including a subset of the characters in the staging profile identifier definition;
    retrieving a set of prompt definitions according to the subset of characters of the dynamic field, wherein the set of prompt definitions comprises user-selectable parameters configured to be inserted in the string of characters to generate the staging profile identifier;
    presenting prompts via an output assembly of the client device according to the set of prompt definitions;
    receiving input data corresponding to the prompts via an input assembly of the client device;
    retrieving a selected parameter corresponding to the input data; and
    replacing the subset of characters of the dynamic field with the selected parameter to generate the staging profile identifier; and
  receiving network configuration data with the staging profile identifier definition, the network configuration data configured for establishing a connection between the client device and a network;
  transmitting a request to the server including the staging profile identifier requesting the one of the plurality of staging data files stored in the server; and
  retrieving the one of the plurality of staging data files from the server in response to transmitting the request to the server.

2. The method of claim 1, wherein receiving the staging profile identifier definition comprises at least one of:
  capturing an indicium and decoding the staging profile identifier definition from the indicium;
  recording an audio signal and extracting the staging profile identifier definition from the audio signal; and
  receiving data from a radio-frequency tag containing the staging profile identifier definition.

3. The method of claim 1, wherein the string includes:
  a static server identifier portion; and
  a filename portion containing the dynamic field.

4. The method of claim 1, wherein the dynamic field contains an identifier of a storage location for the set of prompt definitions.

5. The method of claim 4, wherein the storage location corresponds to the server, and wherein retrieving the set of prompt definitions comprises:
  sending a definitions request for the set of prompt definitions to the server according to the dynamic field; and
  receiving the set of prompt definitions from the server in response to sending the definitions request.

6. The method of claim 1, wherein receiving the network configuration data further comprises:
  detecting a further dynamic field in the staging profile identifier definition; and
  generating the network configuration data based on the further dynamic field.

7. The method of claim 1, further comprising, responsive to transmitting the request:
  receiving the one of the plurality of staging data files; and
  executing the received staging data file at the client device.

8. A client computing device, comprising:
  a communications interface;
  a memory; and
  a processor interconnected with the communications interface and the memory, the processor configured to:
    receive a staging profile identifier definition including a string of characters;
    generate a staging profile identifier corresponding to one of a plurality of staging data files stored at a server, by:
      detecting a bounding character in the string of characters, the bounding character indicating a dynamic field including a subset of the characters in the staging profile identifier definition;
      retrieving a set of prompt definitions according to the subset of characters of the dynamic field, wherein the set of prompt definitions comprises user-selectable parameters to be inserted in the string of characters to generate the staging profile identifier;
      presenting prompts via an output assembly of the client device according to the set of prompt definitions;
      receiving input data corresponding to the prompts via an input assembly of the client device;
      retrieving a selected parameter corresponding to the input data; and
      replacing the subset of characters of the dynamic field with the selected parameter to generate the staging profile identifier; and
    receive network configuration data with the staging profile identifier definition, the network configuration data configured for establishing a connection between the client device and a network;
    transmit a request to the server including the staging profile identifier requesting the one of the plurality of staging data files stored in the server; and
    retrieve the one of the plurality of staging data files from the server in response to transmitting the request to the server.

9. The client computing device of claim 8, wherein the processor is configured to receive the staging profile identifier definition by at least one of:
  capturing an indicium and decoding the staging profile identifier definition from the indicium;
  recording an audio signal and extracting the staging profile identifier definition from the audio signal; and
  receiving data from a radio-frequency tag containing the staging profile identifier definition.

10. The client computing device of claim 8, wherein the string includes:
  a static server identifier portion; and
  a filename portion containing the dynamic field.

11. The client computing device of claim 8, wherein the dynamic field contains an identifier of a storage location for the set of prompt definitions.

12. The client computing device of claim 11, wherein the storage location corresponds to the server, and wherein retrieving the set of prompt definitions comprises:
sending a definitions request for the set of prompt definitions to the server according to the dynamic field; and
receiving the set of prompt definitions from the server in response to sending the definitions request.

13. The client computing device of claim 8, wherein the processor is further configured to receive the network configuration by:
detecting a further dynamic field in the staging profile identifier definition; and
generating the network configuration data based on the further dynamic field.

14. The client computing device of claim 8, wherein the processor is further configured, responsive to transmitting the request, to:
receive the one of the plurality of staging data files for storage in the memory; and
execute the received staging data file.

15. A method of dynamic staging in a server, comprising:
storing, in a memory of the server, (i) a plurality of staging data files, each staging data file containing client device configuration data, and (ii) a plurality of sets of prompt definitions, wherein each one of the plurality of sets of prompt definitions comprises user-selectable parameters to be inserted in a string of characters of a staging profile identifier definition, to generate a staging profile identifier;
receiving, from a client device, a request for one of the sets of prompt definitions, the request including an identifier of a storage location of the one of the sets of prompt definitions;
retrieving and sending, based on the storage location, the one of the sets of prompt definitions to the client device;
receiving, from the client device, a request for network configuration data, the request including the staging profile identifier, wherein the staging profile identifier includes a selected parameter inserted by the client device into the string of characters of the staging profile identifier definition to replace a dynamic field of the staging profile identifier definition and thereby generate the staging profile identifier, responsive to receipt of input data corresponding to the prompts at the client device;
in response to receiving the request, retrieving one of the staging data files from the memory that corresponds to the staging profile identifier; and
transmitting the retrieved staging data file to the client device.

* * * * *